United States Patent Office 3,720,608
Patented Mar. 13, 1973

3,720,608
METHOD AND APPARATUS FOR CONDITIONING AND DISPOSING OF ALUM SLUDGE FROM WATER TREATMENT
James D. Stauffer, Columbus, Ohio, assignor to Bonham, Grant & Brundage Limited, Columbus, Ohio
Filed Sept. 8, 1971, Ser. No. 178,702
Int. Cl. B01d 21/01
U.S. Cl. 210—56
4 Claims

ABSTRACT OF THE DISCLOSURE

A process and apparatus for Pollution Abatement by the transfer, conditioning and disposing of alum sludge. An apparatus is disclosed consisting of (1) a holding tank which receives solids from the clarification settling tanks of a water or a waste water purification plant; (2) a system of heat exchangers, for heat recovery and auxiliary heat application to raise the temperature of the incoming sludge; (3) a detention vessel to provide for a reaction time; (4) a decant tank; and (5) a dewatering unit for separation of the solids from the conditioned sludge.

The method disclosed comprises the subjecting of the alum sludge to a temperature of about 212° F. for a period of about 30 minutes and the separation of the solids from the liquid fraction to produce a low moisture content sludge cake suitable for ultimate disposal or for use as an industrial raw material.

BACKGROUND OF THE INVENTION

My invention relates to a method for the prevention of water pollution arising from and growing out of the use of aluminum sulfate (alum) in the clarification (coagulation) process in water and waste water purification operations. Alum sludge from the clarification process must be disposed of and cannot be discharged into surface streams or lakes because it is a pollutant to the extent that it discolors the streams, adds to the mineral content, and forms deposits on the stream bed.

The usual prior methods of ultimately disposing of alum sludge are limited by local conditions with some of the possible methods as follows:

(1) Lagooning (permanent or temporary).
(2) Discharge to sanitary sewers.
(3) Application to farmland.
(4) Centrifuging, vacuum filtration or filter pressing with final disposal in landfill or recovery unit.
(5) Drying beds.
(6) Pipeline or truck transport to a central disposal or recovery unit.

The main problem to overcome in sludge disposal is that of reducing the sludge volume by improved techniques of solids concentration and dewatering.

Alum sludges should be conditioned prior to the dewatering thereof with vacuum filters, centrifuges or filter presses. The conditioning is performed to coagulate the solids dispersed in the sludge and therefore increase the rate of water removal by one of the previously stated dewatering methods. Various polyelectrolytes have been tried as coagulant chemicals for this purpose with very little to marginal success. Also, in actual application, storage and feeding of the polyelectrolytes and control of the complete conditioning and dewatering system is very difficult and complex. I have therefore used heat treatment of the alum sludge as a conditioning step prior to dewatering techniques. I have discovered that heat treatment of the alum sludge at a temperature of from 175° F. to 300° F. for a period of from 20–35 minutes conditions the sludge effectively for the dewatering step and that heating to a temperature of from 200° F. to 250° F. is even more effective. Specifically, heating to a temperature of about 212° F. for a period of about thirty minutes conditions the sludge most effectively prior to dewatering, all as shown in FIG. 2. The heat conditioning at or about the specified temperatures produces a remarkable change in the gelatinous consistency of the sludge to one in which the specific resistance is reduced to about $1 \times 10^8$ sec.$^2$ gm. and in which the entrapped water is readily released and can be easily removed.

My invention of heat-conditioning treats the alum sludge in a completely closed system prior to dewatering and eliminates the need for coagulant chemical storage and feeding, and the complex system of sludge conditioning tanks and chemical feeding controls.

Where, in the past, alum sludges from the water treatment clarification have been discharged into surface streams and lakes, new regulations are being enforced which prevent this method of disposal. Also, where alum sludges have been discharged to lagoons, the problem of providing adequate lagoons and ultimate disposal from these lagoons must still be solved. To provide for the most effective means of reducing the sludge volume and therefore improving and simplifying the possible methods of ultimate disposal, an effective method of conditioning the sludge prior to dewatering is needed.

OBJECTS

It is therefore the object of my invention to provide more efficient methods for the transfer, conditioning and disposing of alum sludge.

It is a further object of my invention to provide improved apparatus for the transfer, conditioning and disposing of alum sludge.

It is a further object of my invention to prevent the pollution of the water by the products of water treatment plant clarification processes.

It is a further object of my invention to insure a waste sludge from a water treatment plant clarification process which has a low moisture content and is less objectionable to the people of our country. Furhter objects and features of my invention will be apparent from the following specification and claims when considered in connection with the accompanying drawing illustrating several embodiments of my invention.

SUMMARY OF THE INVENTION

I have found that these and other objects may be attained by a method wherein alum sludge from the clarification settling tanks of a water or waste water treatment plant is delivered to a holding tank, and wherein the alum sludge is heated and moved to a detention vessel and then into a decant tank. After heat conditioning, the alum sludge is delivered to a dewatering unit where the filtrate is recycled back through the treatment plant and the sludge cake is removed for disposal in a landfill or used as an industrial raw material.

I have also found that these objects may be attained by the use of an apparatus comprising a holding tank, means for heating the sludge delivered from the holding tank, a detention vessel, a decant tank, and a dewatering unit, and means for delivering the sludge sequentially from said holding tank to said heating means, said detention vessel, said decant tank, and a dewatering unit, and means for delivering the sludge sequentially from said holding tank to said heating means, said detention vessel, said decant tank and said dewatering unit.

DETAILED DESCRIPTION

Figure 1:
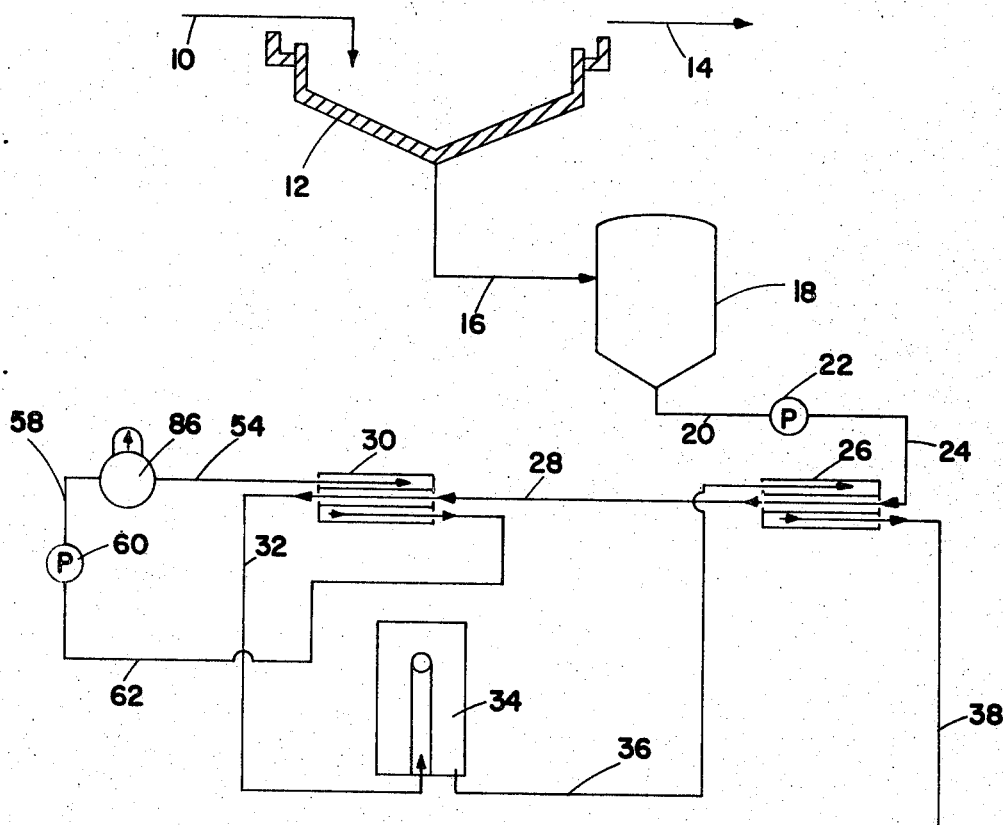
FIG. 1 is a largely diagrammatic view showing the clarification settling tank of a water or waste water purification system into which chemically dosed raw water is directed so that the alum sludge settles out and the clarified water is directed to additional treatment. Then the alum sludge therefrom is directed to a holding tank and to a detention vessel and thence to a decant tank and dewatering unit for the separation of the solids from the liquid fraction to produce a low moisture content sludge cake for ultimate disposal.

A water and/or waste water purification plant is disclosed in FIG. 1 wherein is shown a clarification settling tank 12 into which chemically dosed water is fed by line 10. An effluent line 14 to additional treatment and a sludge outlet line, both leading from the tank 12, are also provided. From the tank 12, the sludge flows through line 16 to the holding tank 18 where the sludge is stored for continuous feeding through the heat conditioning apparatus. The stored sludge flows through line 20 to the system sludge pump 22, is forced out through line 24 into the inlet side of the recovery heat exchanger 26, passes out through line 28 to the auxiliary heat exchanger 30, then through line 32 into the detention vessel 34 and out through line 36 to the outlet side of the recovery heat exchanger 26, thence through line 38 to decant tank 40. In the detention vessel the temperature is maintained for any reasonable period such as for from 20–35 minutes at substantially the temperature to which it is raised in the auxiliary heat exchanger 30. The conditioned sludge collects in the decant tank 40 passing through line 42 to the dewatering unit feed pump 44 and is forced through line 46 to the dewatering unit 48 where low moisture content sludge cake is produced for ultimate disposal. Decant tank overflows through line 52 and dewatering unit filtrate passing through line 50 are combined and recycled to the treatment plant raw water intake and eventually are recycled through line 10. Heat is provided to the auxiliary heat exchanger 30 by the hot water boiler 56 and the hot water circulating pump 60 and piping 58, 62 and 54. A first tube boiler is shown but I can also use a water tube boiler or any other suitable boiler.

The dewatering unit 48 is either a vacuum filter, a centrifuge, a filter press, or it may be any equivalent dewatering equipment.

The heating means may be a steam boiler, a hot water system, or an electric heating unit. However, I prefer if possible to use a system of heat exchangers for the purposes of economy.

Following are some examples of my process of conditioning alum sludge prior to dewatering.

EXAMPLE I

Heat treatment as a conditioning aid was made on an alum sludge having 5.92 percent total solids content. The sludge was heated at 250° F. (15 p.s.i.) for 30 minutes. The sludge was allowed to cool to room temperature. The sludge was then thoroughly mixed and a test was made on a 100 ml. portion to determine specific resistance. The time required to collect 70 ml. of filtrate from the 100 ml. was reduced to less than ⅛ of that required without treatment and the specific resistance was reduced from $13.24 \times 10^8$ sec.$^2$/gm. without treatment to $1.52 \times 10^3$ sec.$^2$/gm.

EXAMPLE II

Heat treatment as a conditioning aid was made on an alum sludge having 6.43 percent total solids content. The sludge was heated at 160° F. at atmospheric pressure for 30 minutes. The sludge was allowed to cool to room temperature. The sludge was then thoroughly mixed and a test was made on a 100 ml. portion to determine specific resistance which was $14.32 \times 10^8$ sec.$^2$/gm. as compared with $24.57 \times 10^8$ sec.$^2$/gm. without treatment. The time required to collect 30 ml. of filtrate from the 100 ml. was reduced from 766 seconds to 315 seconds.

EXAMPLE III

Heat treatment as a conditioning aid was made on an alum sludge having 6.43 percent total solids content. The sludge was heated at 287° F. at pressure of 40 p.s.i. for 30 minutes. The sludge was allowed to cool to room temperature. The sludge was then thoroughly mixed and a test was made on a 100 ml. portion to determine specific resistance which was $1.79 \times 10^8$ sec.$^2$/gm. as compared with $24.57 \times 10^8$ sec.$^2$/gm. without treatment. The time required to collect 30 ml. of filtrate from the 100 ml. was reduced from 766 seconds to 65 seconds.

EXAMPLE IV

Heat treatment as a conditioning aid was made on an alum sludge having 6.43 percent total solids content. The sludge was heated at 250° F. at 15 p.s.i. for 20 minutes. The sludge was allowed to cool to room temperature. The sludge was then thoroughly mixed and a test was made on a 100 ml. portion to determine specific resistance which was $1.38 \times 10^8$ sec.$^2$/gm. as compared with $24.57 \times 10^8$ sec.$^2$/gm. without treatment. The time required to collect 30 ml. of filtrate from the 100 ml. was reduced from 766 seconds to 46 seconds.

EXAMPLE V

Heat treatment as a conditioning aid was made on an alum sludge having 6.43 percent total solids content. The sludge was heated at 250° F. for 15 p.s.i. for 30 minutes. The sludge was allowed to cool to room temperature. The sludge was then thoroughly mixed and a test was made on a 100 ml. portion to determine specific resistance which was $1.34 \times 10^8$ sec.$^2$/gm. as compared with $24.57 \times 10^8$ sec.$^2$/gm. without treatment. The time required to collect 30 ml. of filtrate from the 10 ml. was reduced from 766 seconds to 45 seconds.

EXAMPLE VI

Heat treatment as a conditioning aid was made on an alum sludge having 6.43 percent total solids content. The sludge was heated at 250° F. at 15 p.s.i. for 60 minutes. The sludge was allowed to cool to room temperature. The sludge was then thoroughly mixed and a test was made on a 100 ml. portion to determine specific resistance which was $1.32 \times 10^8$ sec.$^2$/gm. as compared with $24.57 \times 10^3$ sec.$^2$/gm. without treatment. The time required to collect 30 ml. of filtrate from the 100 ml. was reduced from 766 seconds to 44 seconds.

EXAMPLE VII

Heat treatment as a conditioning aid was made on an alum sludge having 6.43 percent total solids content. The sludge was heated at 212° F. at atmospheric pressure for 30 minutes. The sludge was allowed to cool to room temperature. The sludge was then thoroughly mixed and a test was made on a 100 ml. portion to determine specific resistance which was $0.97 \times 10^8$ sec.$^2$/gm. as compared with $24.57 \times 10^8$ sec.$^2$/gm. without treatment. The time required to collect 30 ml. of filtrate from the 100 ml. was reduced from 766 seconds without treatment to 28 seconds.

OPERATION

The operation of the system is fairly obvious. Incoming chemically dosed raw water flows in at 10 and is separated into effluent passing on to additional treatment at the plant through line 14, and sludge passing out through line 16 to the holding tank 18. There the sludge is stored for continuous feed out through line 20 to the heat conditioning system pump 22. Sludge delivered from the pump 22 passes through line 24 to the inlet side of the recovery heat exchanger, through line 28 to the auxiliary heat exchanger 30, through line 32 to detention vessel 34, and through line 36 to the outlet side of the recovery heat exchanger 26, all of the above being arranged in series. From the heat exchanger 26, the sludge passes through line 38 to the decant tank 40. The conditioned sludge is fed to the dewatering unit 48 through lines 42 and 46 by feed pump 44. Filtrate from the dewatering unit and decant tank overflow pass through lines 50 and 52 to the treatment plant raw water intake, as for example, through line 10. The auxiliary heat required to bring the sludge up to the design temperature of 212° F. is supplied through the auxiliary heat exchanger 30 by the hot water boiler 56 and the hot water circulating system of piping 58, 62 and 54 and pump 60.

Figure 2:
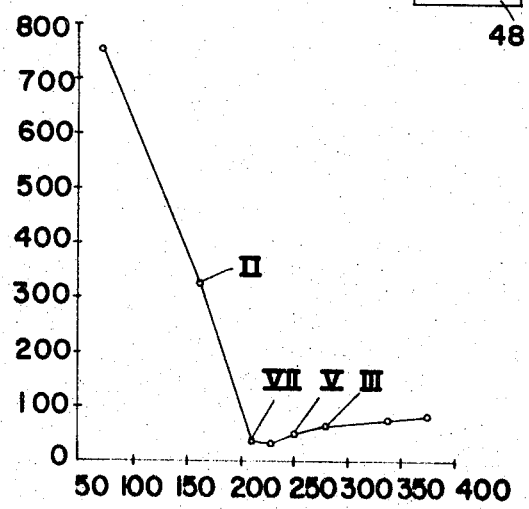
FIG. 2 is a diagram or chart showing as an illustration the effect of heat treatment temperature on time in seconds to collect 30 ml. of filtrate from a 6.43% total solids alum sludge.

In FIG. 2, there is provided a chart showing some of the important factors of various examples including some but not all of the Examples I-VII, and including also other examples not given above. In FIG. 2, the correspondence of the examples given above with various points on the chart are indicated by Roman numerals II, III, V, and VII.

It is to be understood that while the detailed drawings and specific examples given describe preferred embodiments of the invention, they are for the purpose of illustration only; that the apparatus of the invention is not limited to the precise details and conditions disclosed; and that various changes may be made therein without departing from the spirit of the invention which is defined by the following claims.

I claim:

1. In a method for transfer, conditioning and disposing of alum sludge derived from a water treatment clarification process, wherein the chemically dosed raw water is allowed to settle into layers of alum sludge and effluent, wherein the sludge and the effluent are each removed separately, and wherein said sludge is processed to dewater it;

the improvement which comprises:

heat conditioning the alum sludge prior to dewatering by heating the sludge to a temperature in the range of from about 200° F. to about 230° F. for a period of from 20-60 minutes;

cooling said conditioned sludge; and then passing the cooled conditioned sludge through a dewatering process for separation of the solids from the liquid fraction.

2. The method of claim 1 in which the alum sludge is heated to a temperature of approximately 212° F. and held there for a period of about 30 minutes.

3. The method of claim 1 in which the alum sludge is heated by passing it through a recovery heat exchanger, an auxiliary heat exchanger and a detention vessel wherein the detention vessel is intermediate the heat exchangers.

4. The method of claim 1 in which the specific resistance of the sludge is decreased to approximately $1 \times 10^8$ sec.$^2$/gm.

References Cited

UNITED STATES PATENTS

| | | | |
|---|---|---|---|
| 2,131,711 | 9/1938 | Porteous | 210—56 X |
| 2,075,224 | 3/1937 | Porteous | 210—71 X |
| 3,464,917 | 9/1969 | Porteous | 210—71 X |

OTHER REFERENCES

Disposal of Wastes From Water Treatment Plants, part 1, AWWA Research Foundation Report, Jour. AWWA, October 1969, pp. 541-546 and 564-566 (P.O.S.L.).

MICHAEL ROGERS, Primary Examiner

U.S. Cl. X.R.

210—10, 71, 81